United States Patent [19]

Butler

[11] 3,949,835
[45] Apr. 13, 1976

[54] FOLDABLE HUNTING STOOL
[76] Inventor: William E. Butler, 845 Treasure Island Drive, Rte. 1, Mattawan, Mich. 49071
[22] Filed: July 10, 1974
[21] Appl. No.: 486,986

[52] U.S. Cl.............. 182/187; 108/152; 248/221 F
[51] Int. Cl.².................................... A47C 9/10
[58] Field of Search....... 108/152, 18, 48, 115, 134; 248/221 F, 291, 221 R; 182/187

[56] References Cited
UNITED STATES PATENTS

| | | | |
|---|---|---|---|
| 2,394,203 | 2/1946 | Pruder................................ | 182/187 |
| 2,512,174 | 6/1950 | Roeder.............................. | 248/221 |
| 2,855,980 | 10/1958 | Konieczka......................... | 248/221 |
| 2,959,297 | 11/1960 | Larson............................... | 108/152 |
| 3,358,789 | 12/1967 | Laun.................................. | 108/152 |
| 3,392,802 | 7/1968 | Moore................................ | 182/187 |
| 3,598,201 | 8/1971 | Thurmond......................... | 182/187 |
| 3,729,160 | 4/1973 | D'Imperio.......................... | 108/152 |

Primary Examiner—Roy D. Frazier
Assistant Examiner—Darrell Marquette
Attorney, Agent, or Firm—Gordon W. Hueschen

[57] ABSTRACT

A foldable stool which may be compactly folded for carrying and storage, and which may be quickly unfolded and mounted on a tree trunk, comprising a pair of spaced-apart lateral frame members having a seat mounted at one end and a tree-engaging supporting member pivotally connected at one end to the other ends of the lateral frame members, a chain adapted to engage the end of the lateral frame members at the pivotal connection on one side and to be wrapped around a tree trunk and fastened to the other side of the ends of the lateral frame members at the pivotal connection, and stop means to maintain said lateral frame members and said supporting member in fixed relationship in the operative position, while permitting said supporting member to pivot upwardly and to fold over the top of the lateral frame members for storage.

10 Claims, 4 Drawing Figures

U.S. Patent   April 13, 1976   3,949,835
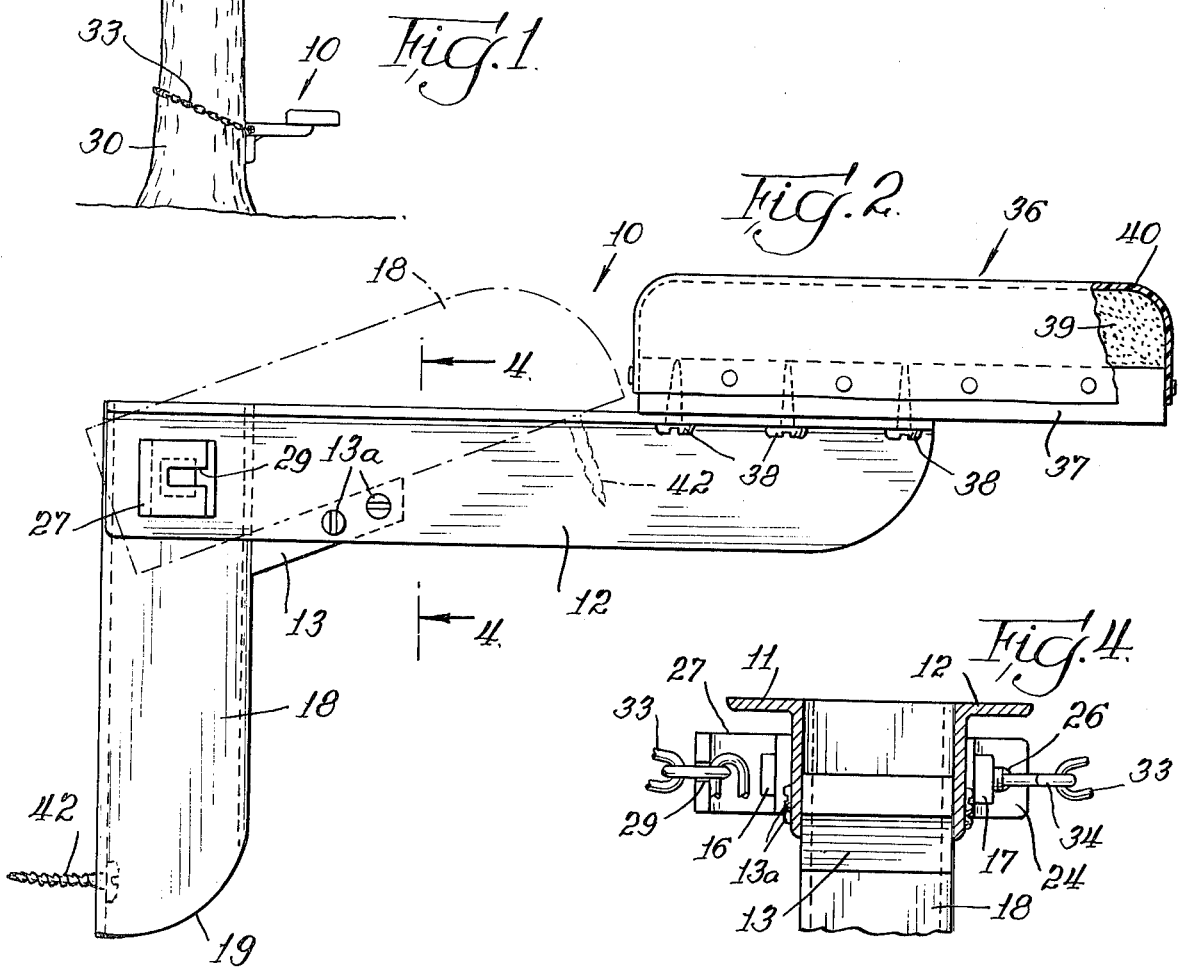

3,949,835

FOLDABLE HUNTING STOOL

BACKGROUND OF THE INVENTION

1. Field of the Invention

The present invention relates to seating equipment and is more particularly concerned with a portable stool which may be readily folded for carrying or storage, and which may be readily opened and mounted on a tree trunk for providing seating means for a person in areas where no chairs or other seating means are available.

2. Prior Art

Portable seating equipment is known in the art and generally comprises a wood frame having a canvas seat mounted thereon. Portable seats which are mountable on tree trunks have also been disclosed in the art. However, they are generally cumbersome, complicated in structure, or do not provide secure support.

SUMMARY OF THE INVENTION

Accordingly, it is an object of the present invention to provide a foldable stool which may be used by hunters and other outdoorsmen. It is a further object to provide a foldable stool which is light and convenient to carry. It is another object to provide a folding stool which may be mounted on a tree trunk. It is a further object to provide such a stool which is sturdy and provides secure support for the person who sits thereon. It is a further object to provide a stool which may be readily and inexpensively fabricated. Still other objects will readily present themselves to one skilled in the art upon reference to the ensuing specification, the drawing, and the claims.

BRIEF DESCRIPTION OF THE DRAWING

In the drawing,

FIG. 1 is a side elevational view showing the foldable stool of the invention mounted on a tree in operable condition.

FIG. 2 is a side elevational view of the stool.

FIG. 3 is a top view of the stool, and

FIG. 4 is a fragmentary cross-sectional view taken at the line 4—4 of FIG. 2, looking in the direction of the arrows.

DESCRIPTION OF THE PREFERRED EMBODIMENT

Referring to FIG. 1, the foldable stool assembly 10 of the invention is shown mounted on a tree trunk 30 by means of a chain 33.

Referring to FIGS. 2–4, the stool assembly 10 is shown in greater detail and comprises a pair of parallel spaced-apart lateral frame members 11 and 12 formed of angle metal. A transverse stop member 13 in the form of a metal bar such as aluminum flat stock is affixed to the lateral frame members 11 and 12 by self-tapping screws 13a. The ends of the lateral frame members 11 and 12 are provided with apertures 14 and 15 having a bolt 16 disposed therein and secured by a nut 17. A support member 18 formed of tubular metal preferably of rectangular cross-section and provided with diagonal or rounded edges 19 at one end is provided with apertures 20 and 21 through which the bolt 16 is journaled. A spacer sleeve 22 and washers 23 are journaled over the bolt 16 intermediate the walls of the support member 18.

An L-shaped bracket 24 is provided with aperture 25 journaled over the bolt 16 and having a chain-engaging aperture 26 at the other portion thereof. A U-shaped bracket 27 is provided with an aperture 28 journaled over the bolt 16 and having a slot 29 provided at another portion thereof.

The embodiment shown in FIGS. 2–4 is particularly adapted for use by a left-handed person, alternatively, the positions of the L-shaped bracket 24 and the U-shaped bracket 27 may be reversed, making the arrangement more convenient for use by a right-handed person. The stop member 13 also serves as a stop for the support member 18 in the folded position, as shown in FIG. 2. A seat 36 comprises a plywood frame 37 mounted on the lateral frame members 11 and 12 by means of screws 38. A foam rubber cushion 39 is mounted over the plywood frame 37 and has a plastic film cover 40 of a material such as polyvinylchloride affixed at its edge to the plywood frame 37 by means of upholstery tacks 41. Although not necessary, screws 42 may be threadedly mounted in an aperture provided in the support member 18 for engaging the tree and preventing slipping.

In use during storage, the support member 18 is folded upward and over the top of the lateral support members 11 and 12 and remains in engagement with one side of the stop member 13. In this position it is very compact and easy to carry. In order to prepare the stool for use, the support member 18 is lifted upwardly and forwardly and pivoted until it reaches a downwardly vertical position, as shown in the solid lines in FIG. 2. In this position the support member 18 engages the transverse stop member 13 and cannot pivot any further with respect to the lateral frame members 11 and 12. One end of an S-hook 34 engages the aperture 26 of the L-shaped bracket, and the other end of the S-hook engages a link of one end of the chain 33. The chain is then wrapped around the tree 30 and pulled tightly and a link thereof is engaged in the slot 29 of the U-shaped bracket 27. The upper portion of the support member 18 and the ends of the lateral frame members 11 and 12 are thus held snugly against the tree trunk 30. The lower portion of the support member 18 also engages the tree and provides extremely firm and strong support, the screws 42 engaging the tree. After use, the entire structure may be quickly disengaged by removing the chain 33 from the slot 29, and the support member 18 then folded upwardly and rearwardly until it comes to rest between the lateral support members 11 and 12 and engaging the other side of the stop 13.

The foldable stool of the invention has a number of advantages over prior art structures. It is extremely light and strong, and readily folds into a very compact structure which is easy to carry. When the support member 18 is folded into operating position, it engages the transverse stop member 13 and extremely strong support is provided preventing the support member from further pivoting with respect to the lateral frame members. A quick positive chain-engaging arrangement is provided permitting the top of the support to be firmly chained to a tree trunk. The slot 29 can engage any link, thereby providing strong support no matter what the diameter of the tree trunk happens to be. The entire structure is then quickly disengaged and folded for further portable transport.

It is to be understood that the invention is not to be limited to the exact details of operation of structure shown and described, as obvious modifications and equivalents will be apparent to one skilled in the art.

I claim:

1. A foldable stool comprising a pair of spaced-apart lateral frame members, a seat mounted on said frame members, a support member adapted to be mounted in the vertical position in the operable seating position, means pivotally connecting the top end of said support member to the ends of said lateral frame members, a fixed stop member affixed to at least one of said lateral frame members and having at least a portion thereof positioned in the space between said lateral frame members and arranged to be engaged by said support member to restrain said lateral frame members from rotating with respect to said support member beyond a position substantially perpendicular to that of said support member in operable seating position but permitting said support member to rotate upwardly and over said lateral frame members into partially nested folded position, and means mounted on said stool for connecting said stool to both ends of a chain.

2. A foldable stool according to claim 1, wherein said pivotal connecting means is a bolt journaled through apertures provided in the ends of said lateral frame members and said supporting member, and means restraining axial movement of said bolt.

3. A foldable stool according to claim 2, wherein said means for connecting the ends of a chain comprise a pair of brackets, one mounted at each end of said bolt and having chain-engaging apertures, one os said apertures being a chain link-engaging slot.

4. A foldable stool according to claim 3 having a chain, wherein at least one end of said chain is permanently attached to one of said brackets and is adapted to be engaged by the chain link-engaging slot of the other.

5. A foldable stool according to claim 1, wherein said a stop member comprises a bar immovably affixed transversely to said lateral frame members.

6. A foldable stool according to claim 5, wherein said bar is affixed to said lateral frame members by screws.

7. A foldable stool according to claim 1, wherein said stop member additionally serves as a stop for said support member in folded position.

8. A foldable stool according to claim 1, wherein said support member is tubular metal of rectangular cross-section.

9. A foldable stool according to claim 1, wherein said supporting member is tubular of square cross-section.

10. A foldable stool according to claim 1, in which said supporting member has pointed means adjacent its bottom end for engaging a tree trunk.

* * * * *